(12) United States Patent
Parkkila et al.

(10) Patent No.: US 10,404,916 B2
(45) Date of Patent: Sep. 3, 2019

(54) MULTI-SOURCE VIDEO STABILIZATION

(71) Applicant: QUALCOMM Incorporated, San Diego, CA (US)

(72) Inventors: Pasi Johannes Parkkila, San Diego, CA (US); Cullum James Baldwin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/691,240

(22) Filed: Aug. 30, 2017

(65) Prior Publication Data

US 2019/0068885 A1 Feb. 28, 2019

(51) Int. Cl.
  *H04N 5/232* (2006.01)
  *H04N 7/01* (2006.01)
  *H04N 5/225* (2006.01)
  *H04N 13/25* (2018.01)

(52) U.S. Cl.
  CPC ....... *H04N 5/23267* (2013.01); *H04N 5/2258* (2013.01); *H04N 5/23258* (2013.01); *H04N 7/0127* (2013.01); *H04N 13/25* (2018.05)

(58) Field of Classification Search
  CPC ............. H04N 5/23267; H04N 7/0127; H04N 5/23251; H04N 5/23254; H04N 5/23264
  See application file for complete search history.

(56) References Cited

U.S. PATENT DOCUMENTS

| | | | |
|---|---|---|---|
| 7,859,588 B2 | 12/2010 | Parulski et al. | |
| 7,978,239 B2 | 7/2011 | Deever et al. | |
| 8,553,106 B2 | 10/2013 | Scarff | |
| 8,743,222 B2 | 6/2014 | Hamalainen | |
| 9,185,291 B1 | 11/2015 | Shabtay et al. | |
| 9,325,899 B1 | 4/2016 | Chou et al. | |
| 9,426,365 B2 | 8/2016 | Laroia et al. | |
| 9,716,825 B1 | 7/2017 | Manzari et al. | |
| 2008/0030592 A1 | 2/2008 | Border et al. | |
| 2009/0213234 A1* | 8/2009 | Chen | H04N 5/23248 348/208.4 |
| 2013/0128121 A1 | 5/2013 | Agarwala et al. | |
| 2017/0034410 A1 | 2/2017 | Yoo et al. | |
| 2017/0150067 A1 | 5/2017 | Han | |
| 2017/0359515 A1* | 12/2017 | Harris | H04N 5/23248 |

FOREIGN PATENT DOCUMENTS

WO 2016061012 A1 4/2016

OTHER PUBLICATIONS

International Search Report and Written Opinion—PCT/US2018/040728—ISA/EPO—Oct. 16, 2018.

* cited by examiner

*Primary Examiner* — Yogesh K Aggarwal (74) *Attorney, Agent, or Firm* — Duane Morris (57) ABSTRACT

Producing stabilized video can include: (a) accessing a first video including a sequence of first frames, (b) accessing a second video including a sequence of second frames, and (c) building the stabilized video based on the accessed first and second videos. The stabilized video can include a sequence of stabilized frames. At least one stabilized frame can include pixels derived from at least one of the first frames and at least one of the second frames.

23 Claims, 8 Drawing Sheets

MULTI-SOURCE VIDEO STABILIZATION

CROSS-REFERENCE TO RELATED APPLICATIONS

None.

STATEMENT ON FEDERALLY SPONSORED RESEARCH OR DEVELOPMENT

None.

BACKGROUND

Field of the Disclosure

The present disclosure relates, among other things, to stabilizing digital video.

Description of Related Art

Mobile devices typically include a camera for recording video of a scene. The camera includes an optical assembly, having lenses and apertures, that directs light from the scene onto an image sensor. The image sensor measures the focused light and a processor saves the measurements as a frame (also called an image). A video can include many different frames configured to play in a sequence. If the video has a sufficient frame rate (e.g., 30 frames-per-second), then the frames blend together to simulate motion in the scene.

When recording the scene, a user may hold the mobile device. While holding the mobile device, a user's hands will typically shake or wobble, causing the mobile device camera to capture each frame from a slightly different perspective. As a result, the video will appear to shake.

SUMMARY

Disclosed is a method of producing a stabilized video. The stabilized video can include a sequence of stabilized frames. The method can include: (a) accessing a first video comprising a sequence of first frames, each first frame having a first field of view; (b) accessing a second video comprising a sequence of second frames, each second frame having a second field of view; (c) building the stabilized video based on the accessed first and second videos, each stabilized frame having a stabilized field of view, a first stabilized frame with a first stabilized field of view comprising pixels derived from at least one of the first frames and at least one of the second frames.

At least some of the stabilized fields of view can be the same. All of the stabilized fields of view can be the same. Stabilized fields of view being the same does not require that the content within the field of views of view is the same. When stabilized fields of view are the same, the frames are intended to show approximately the same two dimensional scene area.

Building the stabilized video can include preparing the first stabilized frame by: (a) accessing one of the second frames; (b) positioning (e.g., mapping) the first stabilized field of view with respect to the accessed second frame; (c) cropping a margin of the accessed same frame, the margin falling outside of the first stabilized field of view; (d) populating the cropped margin with pixels derived from one or more first frames.

Building the stabilized video can include (a) populating the stabilized frames with pixels derived from the first frames and with pixels derived from the second frames; (b) equalizing pixel density of at least some of the stabilized frames by interpolating pixels derived from the first frames with pixels derived from the second frames.

The first video can have a first frame rate and the second video can have a second frame rate. The method can include equalizing the first and second frame rates and building the stabilized video such that the stabilized video has the equalized frame rate. Equalizing can include dropping frames from the first video.

One or more processors can be configured to perform the method. The method can be stored as program code on a non-transitory computer-readable medium.

Disclosed is a processing system. The processing system can include one or more processors configured to: (a) access a first video comprising a sequence of first frames, each first frame having a first field of view; (b) access a second video comprising a sequence of second frames, each second frame having a second field of view; (c) build the stabilized video based on the accessed first and second videos, each stabilized frame having a stabilized field of view, a first stabilized frame with a first stabilized field of view comprising pixels derived from at least one of the first frames and at least one of the second frames.

Disclosed is a non-transitory computer-readable medium. The medium can include program code, which, when executed by one or more processors, causes the one or more processors to perform operations. The program code can include code for: (a) accessing a first video comprising a sequence of first frames, each first frame having a first field of view; (b) accessing a second video comprising a sequence of second frames, each second frame having a second field of view; (c) building the stabilized video based on the accessed first and second videos, each stabilized frame having a stabilized field of view, a first stabilized frame with a first stabilized field of view comprising pixels derived from at least one of the first frames and at least one of the second frames.

Disclosed is a processing system. The processing system can include: (a) means for accessing a first video comprising a sequence of first frames, each first frame having a first field of view; (b) means for accessing a second video comprising a sequence of second frames, each second frame having a second field of view; (c) means for building the stabilized video based on the accessed first and second videos, each stabilized frame having a stabilized field of view, a first stabilized frame with a first stabilized field of view comprising pixels derived from at least one of the first frames and at least one of the second frames.

Disclosed is a method of producing a stabilized video. The stabilized video can include a sequence of stabilized frames. The method can include: (a) accessing a first video including a sequence of first frames, each first frame having a first field of view, at least some of the first fields of view being diverse; (b) accessing a second video including a sequence of second frames, each second frame having a second field of view, at least some of the second fields of view being diverse; (c) building the stabilized video including the sequence of stabilized frames by: (i) compositing each second frame with pixels derived from one or more first frames to build a sequence of composite frames; (ii) positioning a stabilized field of view with respect to each of the composite frames; (iii) cropping a margin of each composite frame.

The method can include identifying composite frames with varying pixel densities and equalizing the varying pixel densities by interpolating neighboring pixels. Equalizing the varying pixel densities can occur prior to cropping the margins. The method can include equalizing varying pixel densities of portions of the identified composite frames falling within the stabilized field of view, but not equalizing varying pixel densities of portions of the identified composite frames falling outside the stabilized field of view, such that at least one composite frame has a varying pixel density directly prior to being cropped.

One or more processors can be configured to perform the method. The method can be stored as program code on a non-transitory computer-readable medium.

Disclosed is a processing system for producing a stabilized video, the stabilized video can include a sequence of stabilized frames, each stabilized frame can have a common stabilized field of view. The processing system can include one or more processors configured to: (a) access a first video comprising a sequence of first frames, each first frame having a first field of view, at least some of the first fields of view being diverse; (b) access a second video comprising a sequence of second frames, each second frame having a second field of view, at least some of the second fields of view being diverse; (c) derive pixels from a plurality of the first frames based the common stabilized field of view; (d) derive pixels from a plurality of the second frames based on the common stabilized field of view; (e) prepare the sequence of stabilized frames based on the pixels derived from the plurality of first frames and the pixels derived from the plurality of second frames.

BRIEF DESCRIPTION OF DRAWINGS

For clarity and ease of reading, some Figures omit views of certain features. Unless expressly stated otherwise, the drawings are not drawn to scale.

DETAILED DESCRIPTION

Part 1

While the features, methods, devices, and systems described herein can be embodied in various forms, some exemplary and non-limiting embodiments are shown in the drawings, and are described below. The features described herein are option. Implementations can include more, different, or fewer features than the examples discussed.

The subject matter is described with illustrative examples. The claimed inventions are not limited to these examples. Changes and modifications can be made to the claimed inventions without departing from their spirit. It is intended that the claims embrace such changes and modifications.

Part 2

Figure 1A:
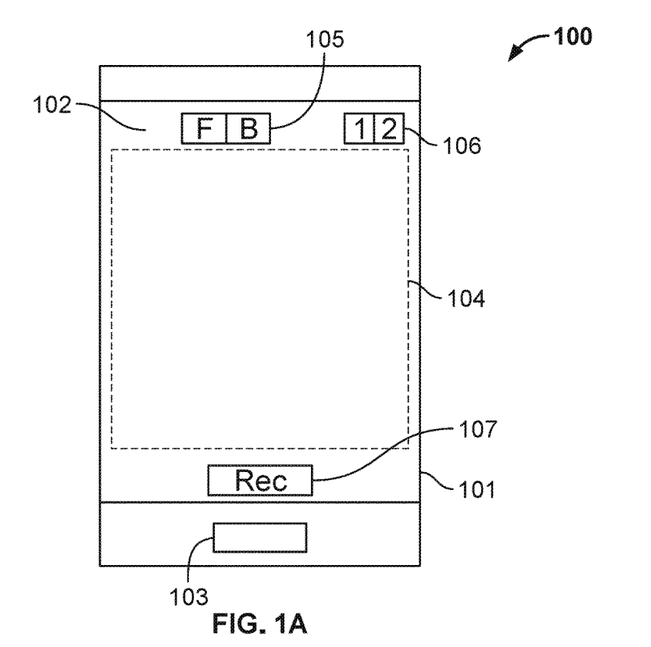
FIG. 1A shows a front of a mobile device.
Figure 1B:
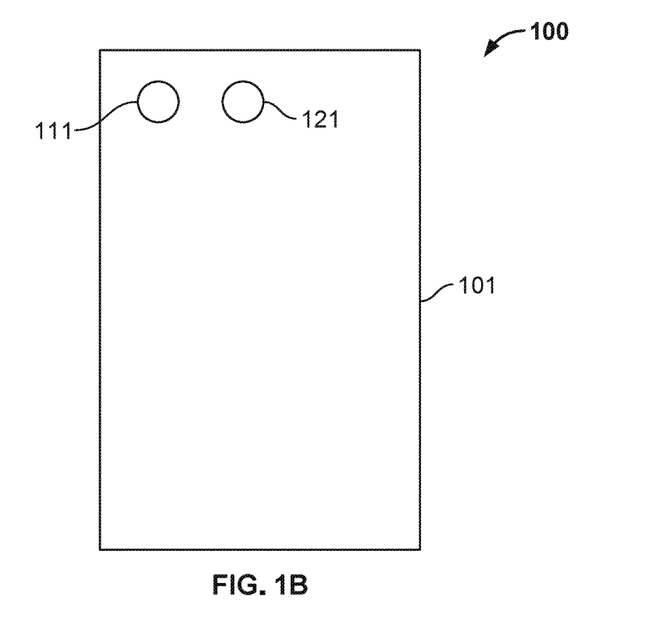
FIG. 1B shows a rear of the mobile device.

Referring to FIGS. 1A and 1B, mobile device 100 can include a frame 101, a display 102, physical button(s) 103, and a rear camera group including a first camera 111 and a second camera 121. Mobile device 100 can be configured to present a viewfinder mode and a gallery mode. Mobile device 100 can be configured to perform any methods, operations, and functions disclosed herein. Mobile device 100 can represent a smartphone, a tablet, a laptop, and the like.

FIG. 1A shows mobile device 100 in viewfinder mode. During viewfinder mode, mobile device 100 can present virtual buttons 105-107. Button 105 enables user selection of an active camera group (e.g., button "F" for a front-facing camera group and button "B" for a rear-facing camera group). The example mobile device 100 of FIGS. 1A and 1B only includes a single rear camera group, but other mobile devices 100 can include a plurality of different camera groups disposed anywhere along frame 101.

Button 106 enables user selection of an active camera within the active camera group. Record button 107 enables the user to record video. Both prior to and during video recording, frames captured by the active camera of mobile device 100 can be presented in viewfinder zone 104. Although not shown, viewfinder zone 104 can be coextensive with display 102 and one or more of virtual buttons 105-107 can be overlaid onto viewfinder zone 107. The frames can be presented as samples. For example, if a particular frame is five megapixels, then the particular frame can be presented by displaying one megapixel sample of the particular frame.

First camera 111 can have a wider field of view and a lower level of optical zoom. Second camera 121 can have a narrower field of view and a higher level of optical zoom. Each camera can include a lens, an aperture, and an image sensor (not shown). According to one example, first camera 111 has a wide-angle lens while second camera 121 has a telephoto lens.

Each image sensor can include an array of photodiodes configured to measure photometrics of light directed onto the image sensor by the lens. Mobile device 100 can be configured to convert the measured photometrics into an image. Mobile device 100 can be configured to record a video by packaging a sequence of images (also called frames) into a video file.

When the user presses record button 107, mobile device 100 can be configured to capture video with first camera 111 and second camera 121 simultaneously. First camera 111 and second camera 121 can have the same or different exposure lengths.

Figure 2:
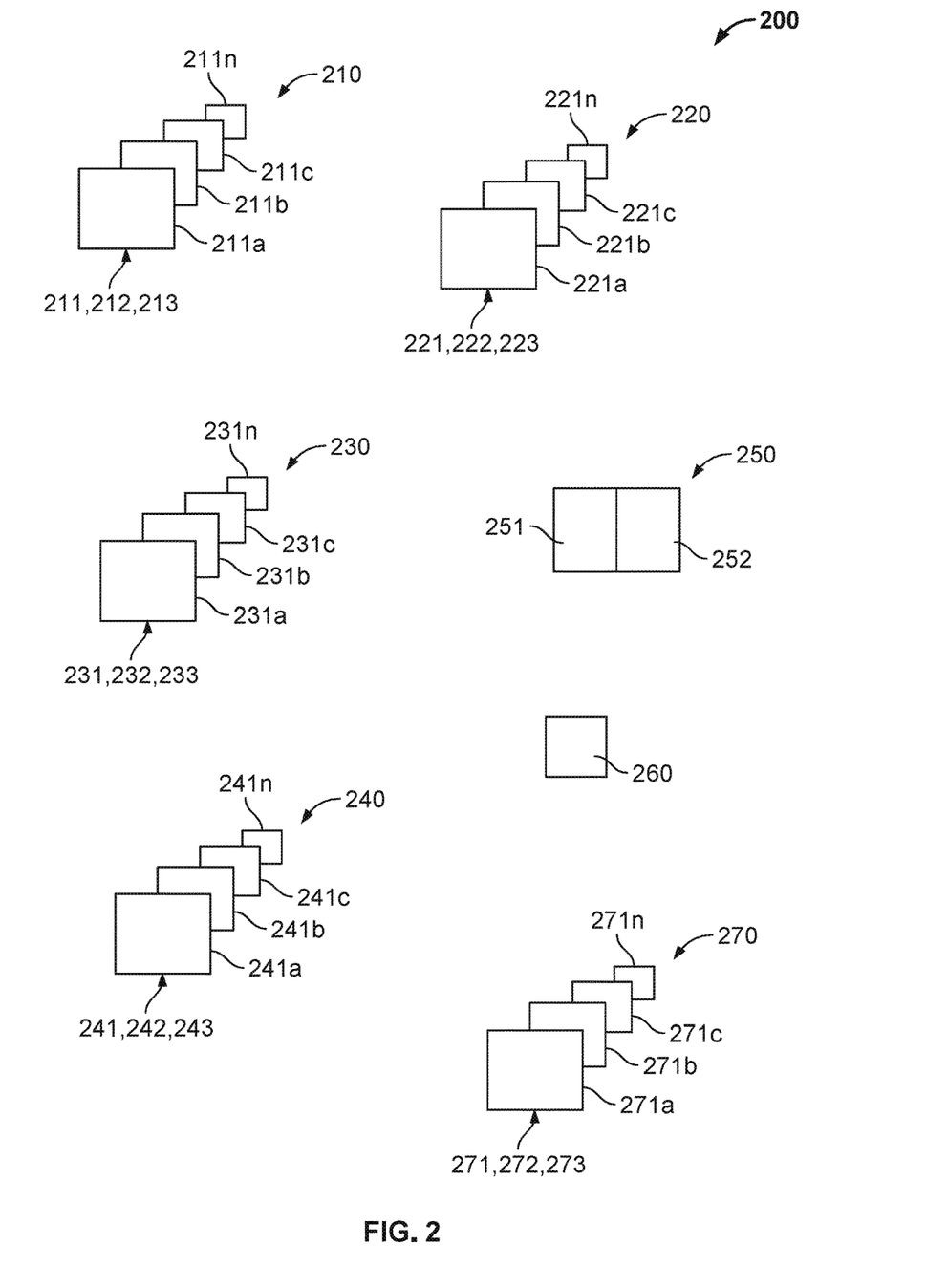
FIG. 2 shows example electronic files.

Referring to FIG. 2, first video 210 captured by first camera 111 can have the same frame rate as, or a different frame rate than, second video 220 captured by second camera 121. As shown in FIG. 1B, first camera 111 and second camera 121 can be adjacent such that the two cameras have at least partially overlapping fields of view. According to some examples, the field of view of first camera 111 encloses the field of view of second camera 121.

Part 3

FIG. 2 schematically depicts a digital file group 200 including first video 210, second video 220, stabilized video 230, composite video 240, calibration 250, map 260, and frame-rate (FR) equalized video 270. Digital file group 200 can result from a single recording sequence. Thus, mobile device 100 can store a plurality of different digital file groups 200, each corresponding to a different recording sequence.

First video 210 can include a sequence of first frames 211, such as frame one 211a, frame two 211b, frame three 211c, ... frame n 211n. Each first frame 211 can have a first field of view 212 and a first level of zoom 213. Second video 220 can include a sequence of second frames 221, such as frame one 221a, frame two 221b, frame three 221c, ... frame n 221n. Each second frame 221 can have a second field of view 222 and a second level of zoom 223. Stabilized video 230 can include a sequence of stabilized frames 231, such as frame one 231a, frame two 231b, frame three 231c, ... frame n 231n. Each stabilized frame 231 can have a stabilized field of view 232 and a stabilized level of zoom 233.

Composite video 240 can include a sequence of composite frames 241, such as frame one 241a, frame two 241b, frame three 241c, ... frame n 241n. Each composite frame 241 can have a composite field of view 242 and a composite level of zoom 243. FR equalized first video 270 can include a sequence of FR equalized frames 271, such as frame one 271a, frame two 271b, frame three 271c, ... frame n 271n. Each FR equalized frame 271 can have a FR equalized field of view 272 and a FR equalized level of zoom 273.

For convenience, the present application inserts letters after fields of view 212, 222, 232, 272 to convey the associated frame 211, 221, 231, 271. For example, field of view 272b is for frame 271b, field of view 212c is for frame 211c, and so on.

First video 210 and second video 220 can represent original photometrics captured by first and second cameras 211, 212 (although both can include interpolated color vectors, since both cameras 211, 212 can include color filters upstream of the photodiodes). First video 210 and second video 220 can be pre-aligned (e.g., pre-rectified and pre-photometrically aligned).

Stabilized, composite, and FR equalized videos 230, 240, 270 can be dynamically generated by mobile device 100 based on first video 210 and second video 220. As such, pixels sourced or derived from stabilized, composite, or FR equalized videos 230, 240, 270 are also considered to be sourced or derived from the original photometrics (i.e., first and second videos 210, 220) that at least partially resulted in the dynamically generated videos 230, 240, 270.

Field of view can be a quantity of two-dimensional scene area captured in an image. Level of zoom can be a quality at which the two-dimensional scene is captured. Level of zoom can be the quantity of pixels per field of view area.

Figure 4:
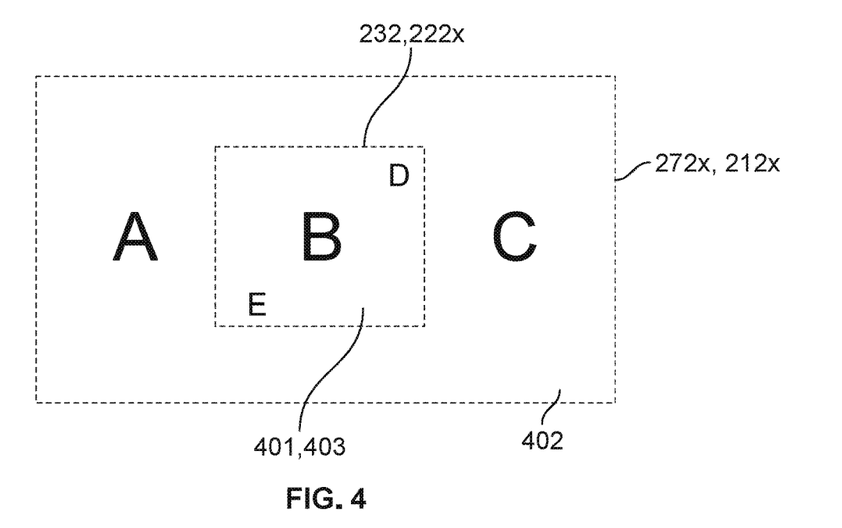
FIG. 4 shows positioned fields of view.

Referring to FIG. 4, both first field of view 212x and second field of view 222x include scene objects B, D, E. If both first frame 211 and second frame 221 have identical resolution, aspect ratio, pixel density, and second level of zoom 223 exceeds first level of zoom 213, then second frame 221, due to its higher level of zoom, will devote more pixels to scene objects B, D, E, than first frame 211.

Calibration 250 can include fixed calibration 251 and dynamic mechanical calibration 252. Fixed calibration 251 can be set at manufacturing and hard-coded (e.g., permanently saved). Fixed calibration 251 can be associated with a single camera group (e.g., the rear camera group) and remain static for all videos captured by the single camera group. Dynamic mechanical calibration 252 can include mechanical properties of mobile device 100 during capture of first and second videos 210, 220.

For example, dynamic mechanical calibration 252 can include reports from gyroscopes, accelerometers, light sensors, autofocus motors (if any or both of first and second cameras 111, 121 include autofocus) and the like. The reports and each frame can be timestamped such that mobile device 100 can pair each first and second frame 211, 211 with time-relevant sensor reports.

Part 4

Mobile device 100 can capture first and second videos 210, 220 at equal frame rates (e.g., 60 fps). Mobile device 100 can capture first video 210 at a different frame rate than second video 220. Let $FR_1$ be the frame rate of first video 210 and $FR_2$ be the frame rate of second video 220. Let T(1,0) be the capture time of the initial first frame 211 and T(2,0) be the capture time of the initial second frame 221. Let T(x) be the capture time of frame x.

If $FR_1=FR_2$ and T(1,0)=T(2,0), then mobile device 100 can link (also called pair, match, associate, or correspond) each second frame 221 with a different first frame 211. For example, second frame 221a can link with first frame 211a, second frame 221b can link with first frame 211b, and so on.

If $FR_1=FR_2$ and T(1,0)≠T(2,0), then mobile device 100 can link each second frame 221 with an interpolation between consecutive first frames 211. For example, second frame 211a can link with an interpolation between first frames 211a and 211b; second frame 211b can link with an interpolation between first frames 211b and 211c; and so on. The interpolation can be a weighted average between the consecutive frames, computed according to the time disparity technique discussed below.

If $FR_1>FR_2$, then mobile device 100 can link each second frame 221 with the first frame 211 captured closest in time, such that some first frames 211 are not linked a second frame 221. For example, second frame 211a can link with first frame 211a, second frame 221b can link with first frame 211c, and so on. As such, FR equalized video 270 can represent first video 210 with dropped frames. Alternatively, mobile device 100 can link each second frame 221 with an interpolation between consecutive first frames 211, such that T(first consecutive first frame 211 (e.g., first frame 211b) <T(second frame 212 (e.g., second frame 221b))<T(second consecutive first frame 211 (e.g., first frame 211c)).

The interpolation can be weighted based on time disparity. Let T(1,0) be the capture time of first frame 211a and T(1,1) be the capture time of first frame 211b. Let T(2,1) be the capture time of second frame 221b. Let $D_1$=abs(T(2,1)−T(1,0)) and $D_2$=abs(T(2,1)−T(1,1)). Thus, the interpolated frame can be a weighted disparity average: interpolated frame=disparity weighted average (first frame 211a, first frame 211b, capture time of second frame 211b)=$(D_2/(D_1+D_2))$*[first frame 211a]+$[D_1/(D_1+D_2)]$*[first frame 211b], where first frames 211 are expressed as a two-dimensional matrix of three-dimensional color vectors and the interpolation is performed for each color channel of the color vector, and then each interpolation is summed.

For example, if first frames 211 had color vectors comprised of red, green, and blue color channels, then the weighted average can be computed for (a) only red color channels, (b) only blue color channels, and (c) only green color channels. Afterwards, results (a), (b), and (c) can be summed to provide a three dimensional color vector for each pixel of the interpolated frame.

If $FR_1<FR_2$, then mobile device 100 can (a) only link some second frames 221 with first frames 211, where the number of second frames 221 linked with first frames 211 is: [total number of second frames]*$[FR_1/FR_2]$, (b) link each second frame 221 with a first frame 211, where some second frames 221 are linked with the same first frame 211, or (c) link each second frame 221 with either a first frame 211 or an interpolation thereof.

Let $FR_1<FR_2$; T(1,0)=T(2,0); T(2,1)<T(1,1); and T(2,2) <T(1,1). According to this example: second frame 211a can link with first frame 211a; second frame 211b with link with a weighted average interpolation between first frame 211a and first frame 211b, where first frame 211a has a relatively higher weight and first frame 211b has a relative lower weight; second frame 211c can link with a weighted average interpolation between first frame 211a and second frame 211b, where first frame 211a has a relatively lower weight and first frame 211b has a relatively higher weight, and so on.

According to option (a) where only some second frames 221 are linked with first frames 211, mobile device 100 can drop the unlinked second frames 221 from stabilized video 230, such that the frame rate of stabilized video is: [total number of second frames]*[FR1/FR2].

Mobile device 100 can prepare and save FR equalized first video 270, such that FR equalized frames 1:1 link to (also called match with) second frames 221 (e.g., FR equalized frame 271a links to second frame 221a, FR equalized frame 271b links to second frame 221b, and so on). Thus, each FR equalized frame 271 can either be a first frame 211 or an interpolation between first frames 211, as previously discussed. According to these examples, each FR equalized frame 271 is derived from one or more first frames 211. As discussed below, map 260 can align each FR equalized frame 271, such that each FR equalized frame 271 is spatially transformed to the perspective of global plane GP and photometrically transformed.

FR equalized video 270 can be stored in map 260 as metadata. For example, if FR equalized frame 271a=first frame 211a and FR equalized frame 271b=½ *first frame 211a+½ *first frame 211b, then map 260 can store FR equalized first video 270 as a series of weighted references to first video 210: [271a=211a, 271b=½*211a+½*211b, and so on]. If FR1=FR2 and T(1,0)=T(2,0), then FR equalized frames 271 be equal to first frames 211. By storing FR equalized video 270 as a series of weighted references, mobile device 100 can conserve memory. When pixel information of a specific FR equalized frame 271 is needed, mobile device 100 can render (e.g., reconstruct) the FR equalized frame 271 based on map 260.

Part 5

Map 260 can include a plurality of spatial transforms and photometric transforms. Mobile device 100 can dynamically generate map 260 as discussed below. The spatial transforms can align frames (a) captured by different cameras and (b) captured at different times. Alignment can include rectification to a global observation plane GP. The rectification can include shifts, warps, rotations, and the like.

Figure 3:
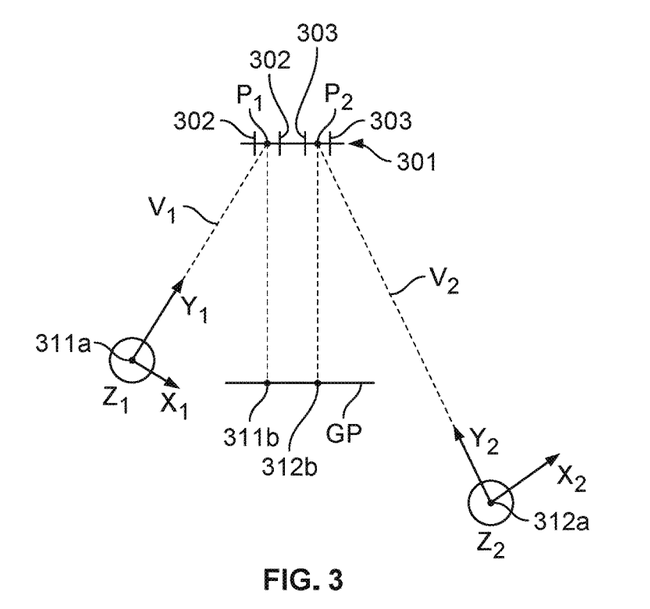
FIG. 3 is a top plan schematic of scene perspectives.

FIG. 3 schematically shows diverse perspectives of a common scene 301. First original point 311a views common scene 301 from the perspective a first coordinate system having first axes $X_1$, $Y_1$, $Z_1$. Second original point 312a views common scene 301 from the perspective of a second coordinate system having second axes $X_2$, $Y_2$, $Z_2$.

First original point 311a intersects common scene 301 at point $P_1$ with vector $V_1$ and thus captures field of view 302. Second original point 312a intersects common scene 301 at point $P_2$ with vector $V_2$ and thus captures field of view 303.

First and second original points 311a, 312a can represent different cameras at the same time or the same camera at different times. For example, first original point 311a can represent first camera 111 at time zero and second original point 312a can represent second camera 121 at time zero. Alternatively, first original point 311a can represent first camera 111 at time zero and second original point can represent first camera 111 at time one. Because a user may involuntarily shake mobile device 100 while recording video, each frame from a single camera can be recorded at a different original point. Because first and second cameras 111, 121 can be spaced on mobile device 100, first and second frames 211, 221 can be captured at different points.

Alignment can include rectification to global plane GP. After being rectified, first frames 211 and 221 can be shifted, warped, rotated, and the like, to simulate the perspective of scene 301 from global plane GP. First frames 211 can be in the form of FR equalized frames 271, discussed further below. Alignment can thus transform the frame captured at first original point 311a to a frame captured at first rectified point 311b and the frame captured at second original point 311b to a frame captured at second rectified point 312b.

Therefore, map 260 can include a plurality of linear and/or non-linear spatial transforms that convert the unique perspective of each first and second frame 211, 221 to a global perspective from global plane GP. The spatial transforms can preserve the original field of view. According to some examples, global plane GP is constant for all first and second frames 211, 221. According to other examples, global plane GP shifts along its Y axis (i.e., the axis normal to scene 301) such that one or more first frames 211 and second frames 221 are rectified to a first global plane GP while one or more first frames 211 and second frames 221 are rectified to a second global plane GP, where the first and second global planes GP are parallel.

As shown in FIG. 3, first original point 311a and first rectified point 311b can share field of view 301 and second original point 312a and second rectified point 312b can share field of view 302. Thus, whenever the present application states that mobile device 100 accesses or otherwise references a first frame 211, a second frame 221, or property thereof (e.g., field of view, level of zoom), such accessing or referencing can occur via a spatial transform that places the image/property in the perspective of global plane GP. Such accessing or referencing can further include photometric transformation.

Let G(a) be the spatial transformation of object "a" to global plane GP and $G^{-1}$(a) be the spatial transformation of object "a" from global plane GP into a unique coordinate system. G(a) can further include photometric transformation and $G^{-1}$(a) can further include inverse photometric transformation.

Let R(a) be the recall of object "a" performed by mobile device 100. Object "a" can be a frame or property thereof (e.g., field of view, level of zoom). Whenever the present application discusses accessing, referencing, etc. an object "a", such a function can be expressed as R(a) and/or R(G(a)). According to some examples, first and second videos 210, 220 have been pre-rectified to the perspective from global plane GP and pre-photometrically aligned.

Alignment can include positioning diverse frames with common (also called intersecting and overlapping) fields of view. For example: (a) each second frame 221 can be positioned with respect to the linked FR equalized frame 271, (b) each stabilized frame 231 can be positioned with respect to one second frame 221, and (c) each stabilized frame 231 can be positioned with respect to one composite frame 241.

Map 260 can store results of positioning as metadata. Frames can be rectified to global plane GP prior to positioning. Techniques for positioning frames with overlapping fields of view are known in the art. U.S. Publication No. 2017/0024846 to Nash et al. discloses, among other things, examples of such techniques. According to some examples, pixels having key items (e.g., edges, brightness, color) in frame A (e.g., stabilized frame 231) are matched with pixels having corresponding key items in the frame B (e.g., composite frame 241).

After these pixels have been matched, mobile device 100 can interpolate (i.e., estimate) to determine how pixels with non-key items should match. Key items and corresponding key items can be identified with a range of known techniques including a sum of square difference technique, a Laplacian of Gaussian technique, a Hessian determinant technique, and the like.

According to some examples, same channel and cross channel horizontal and vertical color gradients are calculated for each pixel in frame A and frame B. A weighted average of (a) same channel and cross channel horizontal color gradients and (b) same channel and cross channel vertical color gradients is computed for each pixel.

The weighted average of each pixel represents an edge direction for each pixel. Pixels in image A are grouped into small clusters and an average edge direction for each small cluster is determined. The average edge direction for each small cluster of image B is then compared with the edge direction for each pixel in a selected central area of image A. According to one example of a sum of square difference technique, the clusters and the selected central area of image A are iterated until the sum of square difference falls below a predetermined threshold value.

Referring to FIG. 4, second field of view 222x has been positioned over FR equalized field of view 272x. FR equalized field of view 272x thus includes an overlapped field of view portion 401 and a remote field of view portion 402 (also called first and second portions 401, 402). Upon positioning, overlapped portion 401 is identical (e.g., substantially identical) to second field of view 222x.

Map 260 can save the positioning as the perimeter of second field of view 222x expressed in the coordinates of FR equalized frame 271x. For example, map 260 can save second field of view 222x as: corner 1, corner 2, corner 3, corner 4, where each corner is an X-Z coordinate of a pixel in FR equalized frame 271x. Positioning of stabilized and composite frames 231, 241 can be expressed with similar conventions.

In addition to spatial alignment, map 260 can include a plurality of photometric transforms that align photometrics (e.g., intensity, contrast) of first and second videos 210, 220.

Part 6

Figure 5:
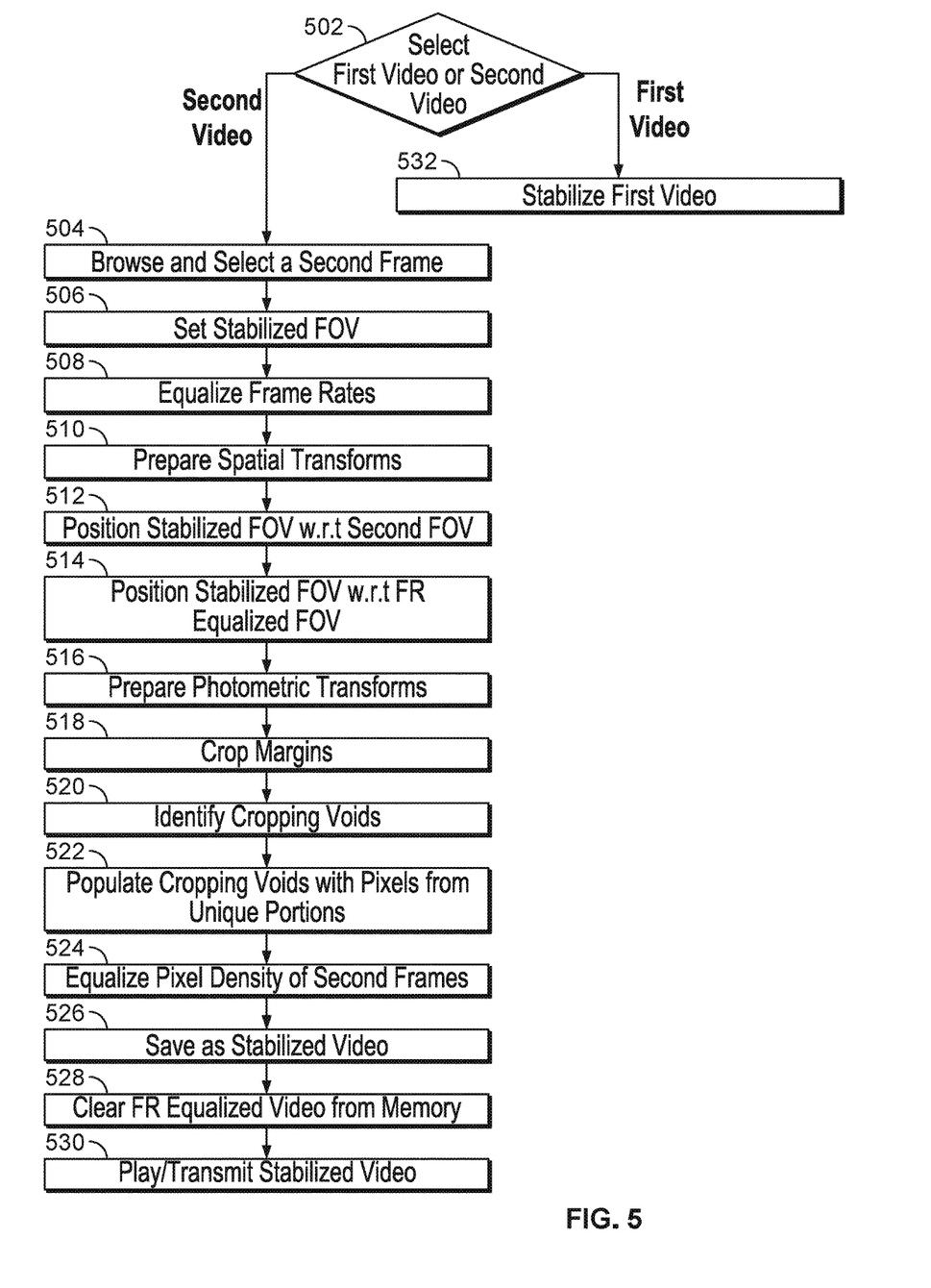
FIG. 5 is a block diagram of an example method.

FIG. 5 illustrates operations (e.g., a method) for producing stabilized video 230. Mobile device 100 can be configured to perform these operations. The operations of FIG. 5 enable mobile device 100 to, among other things: (a) set a stabilized field of view 232, (b) set portions of second video 220 falling outside the stabilized field of view as margins, (c) crop the margins, and (c) replace the cropped margins with pixel data extracted (e.g., sourced) from first video 210. The operations of FIG. 5 enable mobile device 100 to prepare stabilized video 230 such that each stabilized frame 231 has the same resolution, which is equal to the resolution of each second frame 221.

At block 502, the user can select between stabilizing first video 210 and stabilizing second video 220. If the user selects first video 210, then mobile device 100 can proceed to block 532, where mobile device can stabilize first video 210 without reference to second video 220.

At block 504, the user can select browse through each second frame 221 (e.g., pre-alignment). The user can select any second frame 221. At block 506, mobile device 100 can set stabilized field of view 232=second field of view 222 of the selected second frame 221 and global plane GP=X–Z plane of the selected second frame 221. In FIG. 4, the user selected second field of view 222x, thus making stabilized field of view 232 coextensive with second field of view 222x.

Alternatively, the user can set stabilized field of view 232 as being larger or smaller than any second field of view 222. Mobile device 100 can enable user-selection of any desired stabilized field of view 232. According to some examples, mobile device 100 can build one or more composite frames (discussed below), and enable the user to set stabilized field of view 232 over one of the composite frames.

At block 508, mobile device 100 can equalize frame rates using the above-discussed techniques. For example, mobile device 100 can generate FR equalized video 270, such that each second frame 221 is paired with one FR equalized frame 271. Alternatively or in addition, mobile device 100 can drop frames from second video 220. Mobile device 100 can store FR equalized video 270 as metadata in map 260 (e.g., as a series of weighted references to one or more first frames 211). FR equalized video 270 can be equal to first video 210.

At blocks 510-516, mobile device 100 can align FR equalized video 270, second video 220, and stabilized field of view 232. Mobile device 100 can store alignment results as metadata in map 260 to preserve first frames 211 and second frames 221 in their original states.

At block 510, mobile device 100 can rectify each FR equalized frame 271 to global plane GP and rectify each second frame 221 to global plane GP. Mobile device 100 can store the rectifications as metadata listing spatial (e.g., coordinate) transforms in map 260. Each second frame 221 and FR equalized frame 271 pair can be rectified to a different global plane GP or all pairs can be rectified to the same global plane GP.

At block 512, mobile device 100 can position each second frame 221 with respect to each linked FR equalized frame 271, such that each FR equalized field of view 272 includes an overlapped portion 401 and a remote portion 402. Recall that any frames or properties thereof discussed herein can be accessed through one or more map 260 transforms, which can rectify the accessed frames/properties thereof to global plane GP.

Figure 6:
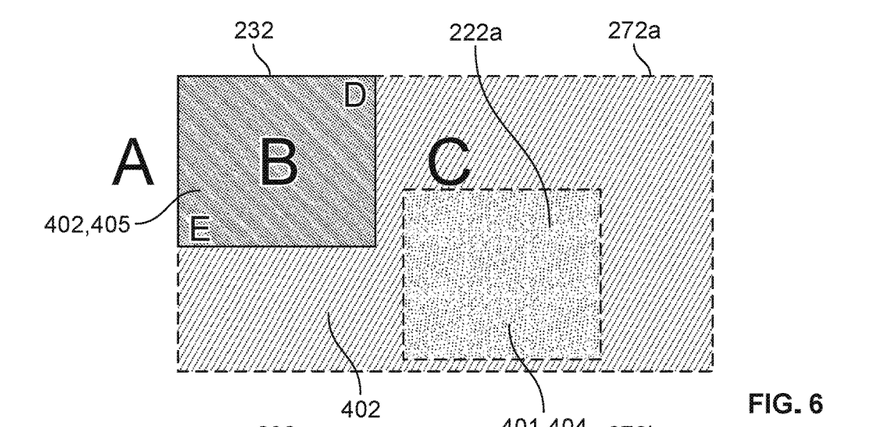
FIGS. 6-8 show positioned fields of view.
Figure 7:
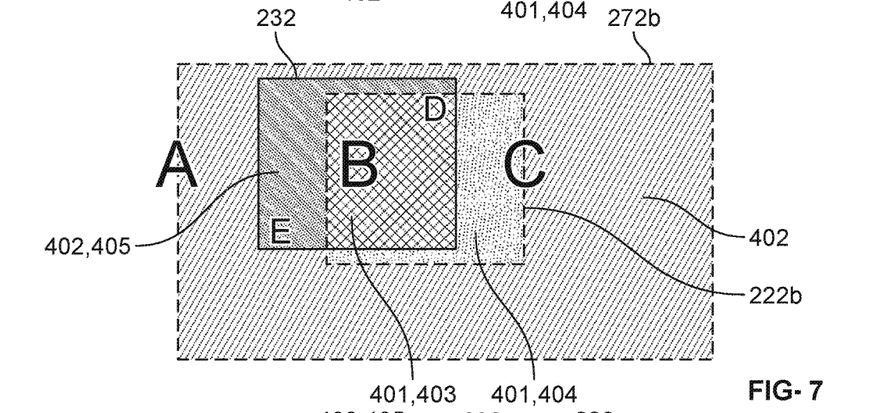
Figure 8:
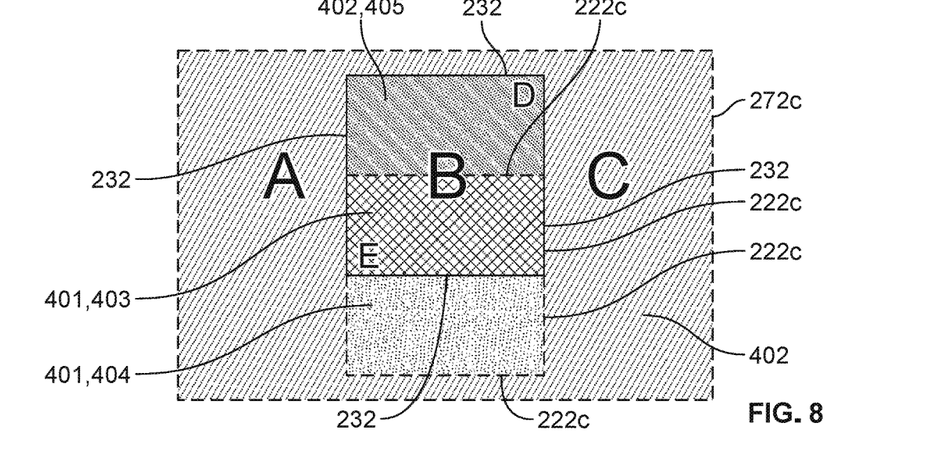

FIGS. 6, 7, and 8 show second fields of view 222a, 222b, 222c positioned over respective linked FR equalized fields of view 272a, 272b, 272c. Thus, each FR equalized field of view 272a, 272b, 272c includes an overlapped portion 401 and a remote portion 402.

At block 512, mobile device 100 can position stabilized field of view 232 with respect to each second field of view 222. FIG. 6 shows stabilized field of view 232 being remote from field of view 222a. FIG. 7 shows stabilized field of view 232 partially overlapping second field of view 222b. FIG. 8 shows stabilized field of view 232 partially overlapping second field of view 222c.

Since each second field of view 222 can be rectified to a different global plane GP (e.g., a plurality of parallel global planes GP, as previously discussed), stabilized field of view 232 can have a different size for each second frame 221.

Therefore, each second field of view 222 can include an intersected field of view portion 403 and an isolated field of view portion 404 (also called first and second portions). Second field of view 222a of FIG. 6 lacks an intersected portion 403. Second field of view 222x of FIG. 4 lacks an isolated portion 404.

At block 514, mobile device 100 can position stabilized field of view 232 respect to each FR equalized field of view 272. Upon positioning, mobile device 100 can identify unique FR equalized field of view portions 405. Unique field of view portions 405 can be defined to overlap stabilized field of view 232, but not overlap second field of view 222. Thus, unique field of view portions 405 can exclusively occupy isolated portions 402. In FIG. 4, FR equalized field of view 272x lacks any unique portions 405. In FIGS. 6-8, FR equalized fields of view 272a, 272b, 272c include unique portions 405.

Since each FR equalized field of view 272 can be rectified to a different global plane GP (e.g., a plurality of parallel global planes GP, as previously discussed), stabilized field of view 232 can have a different size for each FR equalized frame 271.

Mobile device 100 can store any positioning results as metadata in map 260. For example, mobile device 100 can assign two-dimensional coordinates on global plane GP to each pixel in FR equalized frame 271 and each pixel in second frame 221. Mobile device 100 can assign two-dimensional areas on global plane GP to some or all of stabilized field of view 232 and portions 401-405.

At block 516, mobile device 100 can photometrically align each second frame 221 with the linked FR equalized frame 271. Mobile device 100 can store the photometric alignments metadata listing photometric transforms in map 260.

At block 518, mobile device 100 can crop any portions of second frames 221 falling outside stabilized field of view 232. More specifically, mobile device 100 can crop isolated portions 404 of second frames 221. Isolation portions 404 of second frames 221 can thus serve as margins.

At block 520, mobile device 100 can identify any second frames 221 with cropping voids. Cropping voids can appear due to the cropping of isolated portions 404 (i.e., the margin cropping). For example, second frame 221a of FIG. 6 would have a complete cropping void (meaning that all of second frame 221a has been cropped). Second frames 221b, 221c of FIGS. 7 and 8 would have partial cropping voids. Second frame 221x of FIG. 4 would have no cropping void.

At block 522, mobile device 100 can populate cropping voids with pixels extracted from FR equalized frames 271. Mobile device 100 can select the extracted pixels from unique field of view portions 405 of FR equalized frames 271. Because FR equalized frames 271 are based on first frames 211, mobile device 100, when performing block 522, is deriving pixels from first frames 211.

At block 524, mobile device 100 can equalize the pixel density of second frames 221. Because FR equalized frames 271 can have a lower pixel density per field of view than second frames 221 (due to first level of zoom 213 being less than second level of zoom 223), some pixels in the cropping voids will lack color vectors (i.e., the pixels may be missing). Mobile device 100 can interpolate populated pixels neighboring the missing pixel (including pixels from second frames 221) to fill in the missing color vectors.

Since second frames 221 can be rectified to different global planes GP, and thus have different levels of zoom, mobile device 100 can downsample frames to a common resolution at block 524. Mobile device 100 can identify the second frame 221 with the lowest resolution, then downsample the other second frames 221 to the same lowest resolution. As with all operations disclosed herein, block 524 is optional and some examples can maintain a non-uniform pixel density and/or resolution.

At block 526, mobile device 100 can save the manipulated second frames 221 as stabilized frames 231. Each stabilized frame 231 can have a common stabilized field of view 232. As used herein, terms "common", "the same", and the like mean "substantially common" or "substantially the same".

According to the example of FIG. 4, at least one stabilized frame 231 will be identical to second frame 221x with second field of view 222x. At block 528, mobile device 100 can clear any rendered FR equalized video 270 from memory. Mobile device 100 can preserve FR equalized video 270 as metadata in map 260, thus enabling mobile device 100 to later reconstruct FR equalized video 270. At block 530, mobile device 100 can play or transmit stabilized video 230.

As previously discussed and according to some examples, some second frames 221 can be dropped to equalize the frame rate of first video 210 with second video 220. If this is the case, then the above operations can only apply to the preserved second frames 221 (e.g., when the above operations state "each second frame 221", such a reference can only apply to non-dropped second frames 221). Furthermore, after dropping frames from second video 220, preparation of FR equalized video 270 can be unnecessary. In such a case, references to FR equalized video 270 should be understood to mean first video 210.

Part 7

Figure 9:
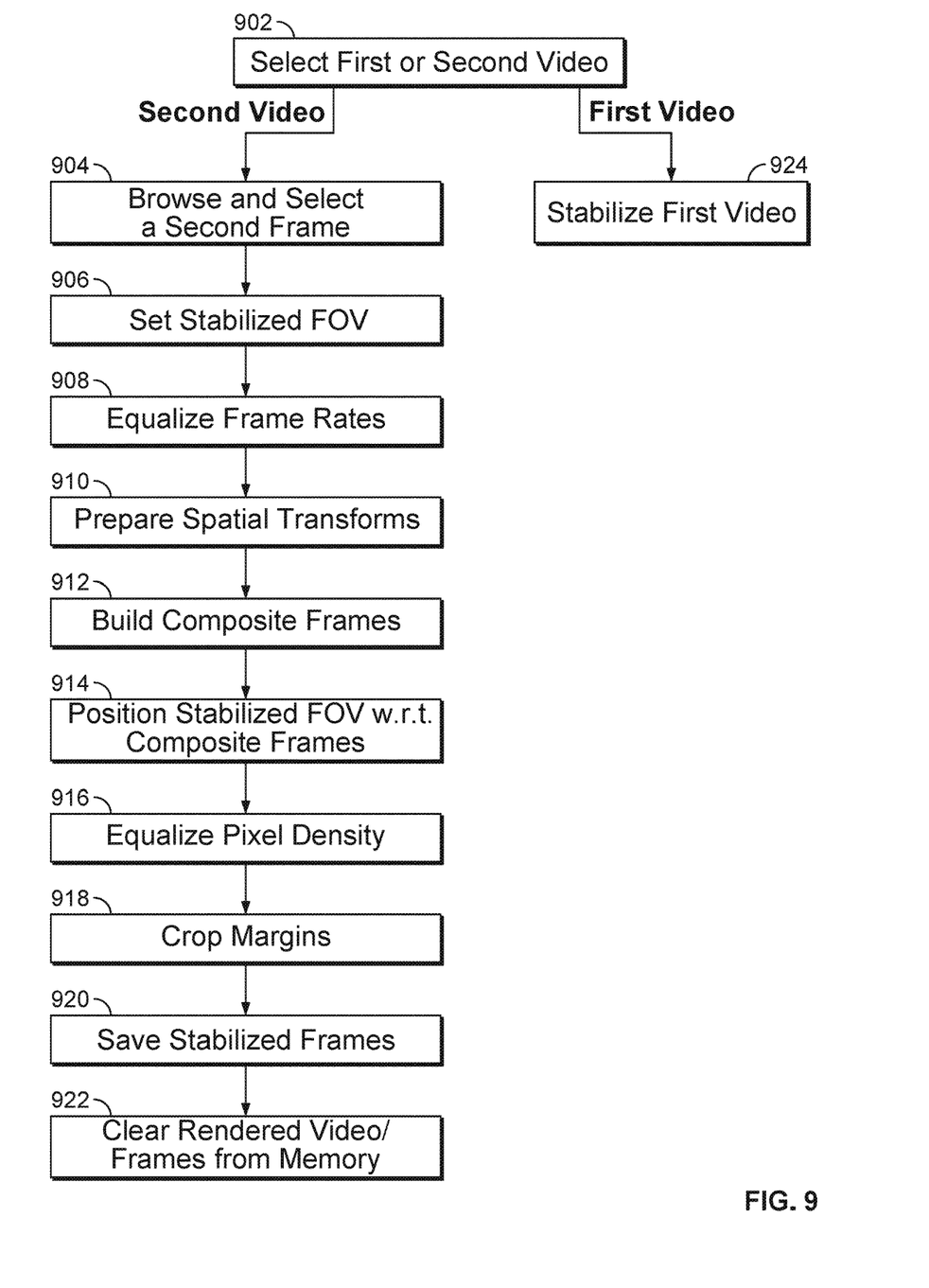
FIG. 9 is a block diagram of an example method.

FIG. 9 illustrates operations (e.g., a method) for producing stabilized video 230. Mobile device 100 can be configured to perform the operations of FIG. 9 alternatively or in addition to the operations of FIG. 5. Mobile device 100 can be configured to perform (a) either the method of FIG. 5 or the method of FIG. 9 upon user-selection and (b) the method of FIG. 5 with respect to an earlier segment of the second video and the method of FIG. 9 with respect to a later segment of the second video.

The operations of FIG. 9 enable mobile device 100 to, among other things: (a) set a stabilized field of view 232, (b) build a composite video 240 from first and second videos 210,220, and (c) apply the stabilized field of view 232 to each composite frame 241, (d) set portions of composite video 241 external to the stabilized field of view as margins, and (e) crop the margins.

Blocks 902-910 can mirror block 502-510 of FIG. 5. At blocks 910-916, mobile device 100 can align FR equalized video 270, second video 220, stabilized field of view 232, and composite video 240. Mobile device 100 can store alignment results as metadata in map 260 to preserved first frames 211 and second frames 221 in their original states.

At block 912, mobile device 100 can construct a plurality of composite frames 241. To do so, mobile device 100 can import each second frame 221 into one composite frame 241. Mobile device 100 can surround each second frame 221 with pixels extracted from the remote portion 402 of the linked FR equalized frame 271.

Composite frames 241 can have non-uniform pixel density, such that the pixel density of a first portion of composite frames 241 (which can be an outer portion), corresponding to remote portion 402, has a lower pixel density than a second portion of composite frames (which can be an inner portion), corresponding to second frames 221.

Composite frames 241 can maintain a non-uniform pixel density or interpolate missing pixels based on the pixels extracted from second frames 221 and FR equalized frames 271. Upon interpolation, composite frames 241 can have a uniform pixel density. After interpolation, and at block 912, mobile device 100 can photometrically align each composite frame 241.

Figure 10:
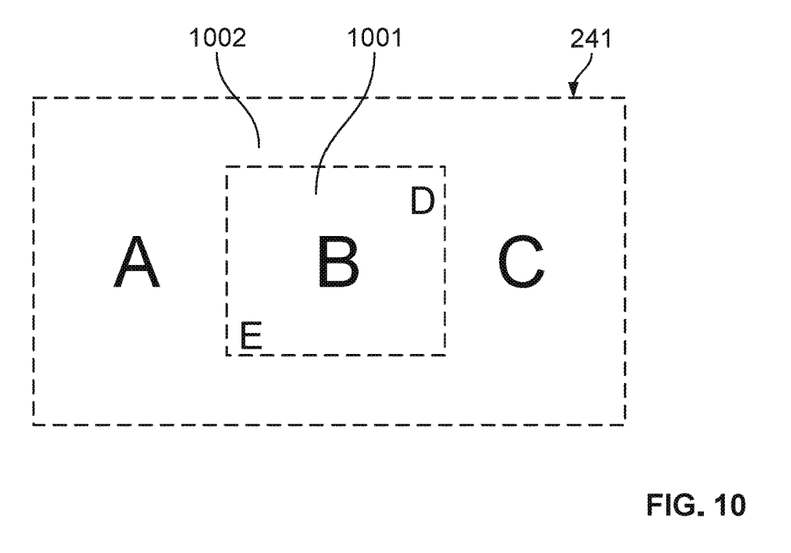
FIGS. 10 and 11 show positioned fields of view.

FIG. 10 shows an example composite frame 241 including a first composite portion 1001 sourced from a second frame 221 (e.g., second frame 221a) and a second composite portion 1002 sourced from a FR equalized frame 271 (e.g., FR equalized frame 271a). Second composite portion 1002 is thus sourced from the one or more first frames 211 that were used to build the FR equalized frame 271. Directly after sourcing, second composite portion 1002 can have a lower pixel density than first composite portion 1001. To equalize pixel density, missing pixels in first portion 1001 can be interpolated.

According to some examples, and as previously discussed with reference to FIG. 5, mobile device 100 can perform some or all of blocks 910-912 to generate one or more composite frames 241. The user can then scroll through the composite frames 241, select a composite frame 241, and then set stabilized field of view 232 on the composite frame 241. Mobile device 100 can accept any user-desired stabilized field of view 232 with any user-desired aspect ratio. After setting the stabilized field of view 232, mobile device 100 can return to block 508 of FIG. 5 or block 906 of FIG. 9.

Figure 11:
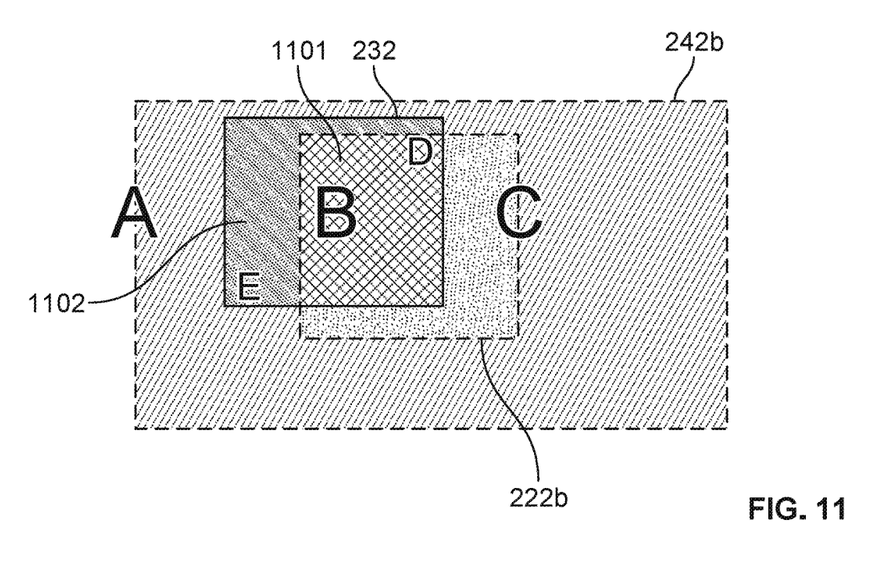

At block 914, mobile device 100 can apply map 260 to position stabilized field of view 232 with respect to each composite frame 241. FIG. 11 shows stabilized field of view 232 being positioned with respect to stabilized field of view 242b. A first stabilized portion 1101 of stabilized field of view 242b overlaps first composite portion 1001. A second stabilized portion 1102 overlaps second composite portion 1002.

Since each composite frame 241 can be the perspective from a different global plane GP (e.g., a plurality of parallel global planes GP, as previously discussed), stabilized field of view 232 can have a different size for each composite frame 241.

At block 916, mobile device 100 can equalize the pixels densities between first and second stabilized portions 1101, 1102 via interpolation, if not already performed. The interpolation can rely on any pixels within composite frame 241 (e.g., composite frame 241b), including pixels disposed outside of first and second stabilized portions 1101, 1102. Both first and second stabilized portions 1101, 1102 do not necessarily exist for every composite frame 241—some composite frames 241 can include first stabilized portion 1101, but not second stabilized portion; and other composite frames 241 can include second stabilized portion 1102, but not first stabilized portion 1101.

The interpolation can only fill in missing pixels within second stabilized portion 1102, since first stabilized portion 1101 can have the higher pixel density. After interpolation, and at block 916, mobile device 100 can photometrically align first and second stabilized portions 1101, 1102 if mobile device 100 has not already done so. After interpolation, mobile device 100 can downsample the composite frames 241 to a common resolution. Mobile device 100 can set the lowest composite frame resolution as the common resolution.

As with all operations disclosed herein, block 916 is optional. By performing interpolation at block 916 instead of earlier, mobile device 100 can conserve computing power by only interpolating relevant missing pixels. By performing interpolation at block 916 instead of later, mobile device 100 can improve interpolation accuracy by relying on pixels that will eventually be cropped.

At block 918, mobile device 100 can crop all pixels from each composite frame 241 falling outside first and second stabilized portions 1101, 1102 (i.e., being external to stabilized field of view 232). Area of a frame external to stabilized field of view 232 can thus serve as a margin. When the present application discusses cropping or removing portions from a frame (e.g., cropping a margin), such an operation can be achieved by modifying the frame or generating a new frame without the cropped or removed portions.

At block 920, mobile device 100 can save the cropped composite frames 241 as stabilized frames 231. Each stabilized frame 231 can have a common stabilized field of view 232. As used herein, terms "common", "the same", and the like mean "substantially common" or "substantially the same".

At least one stabilized frame 231 can be identical to second frame 221x. If interpolation has not occurred, mobile device 100 can equalize the pixel densities of each composite frame 241, via interpolation, at block 920. After interpolation, and at block 920, mobile device 100 can photometrically first and second stabilized portions 1101, 1102 if mobile device 100 has not already done so. After interpolation, and at block 920, mobile device 100 can downsample the composite frames 241 to a common resolution if mobile device 100 has not already done so. Mobile device 100 can set the lowest composite frame resolution as the common resolution.

At block 922, mobile device 100 can clear any rendered composite video 240 and any rendered FR equalized video 270 from memory. Mobile device 100 can preserve FR equalized video 270 and/or composite video 240 as metadata in map 260, thus enabling mobile device 100 to later reconstruct videos 240, 270. At block 924, mobile device 100 can play or transmit stabilized video 230.

As previously discussed and according to some examples, some second frames 221 can be dropped to equalize the frame rate of first video 210 with second video 220. If this is the case, then the above operations can only apply to the preserved second frames 221 (e.g., when the above operations state "each second frame 221", such a reference can only apply to non-dropped second frames 221). Furthermore, after dropping frames from second video 220, preparation of FR equalized video 270 can be unnecessary. In such a case, references to FR equalized video 270 should be understood to mean first video 210.

Part 8

Mobile device 100 can be a smartphone, a tablet, a digital camera, or a laptop. Mobile device 100 can be an Android® device, an Apple® device (e.g., an iPhone®, an iPad®, or a Macbook®), or Microsoft® device (e.g., a Surface Book®, a Windows® phone, or Windows® desktop). Mobile device 100 can be representative of a non-mobile device, such as a vehicle, or a desktop computer (e.g., a computer server).

Figure 12:
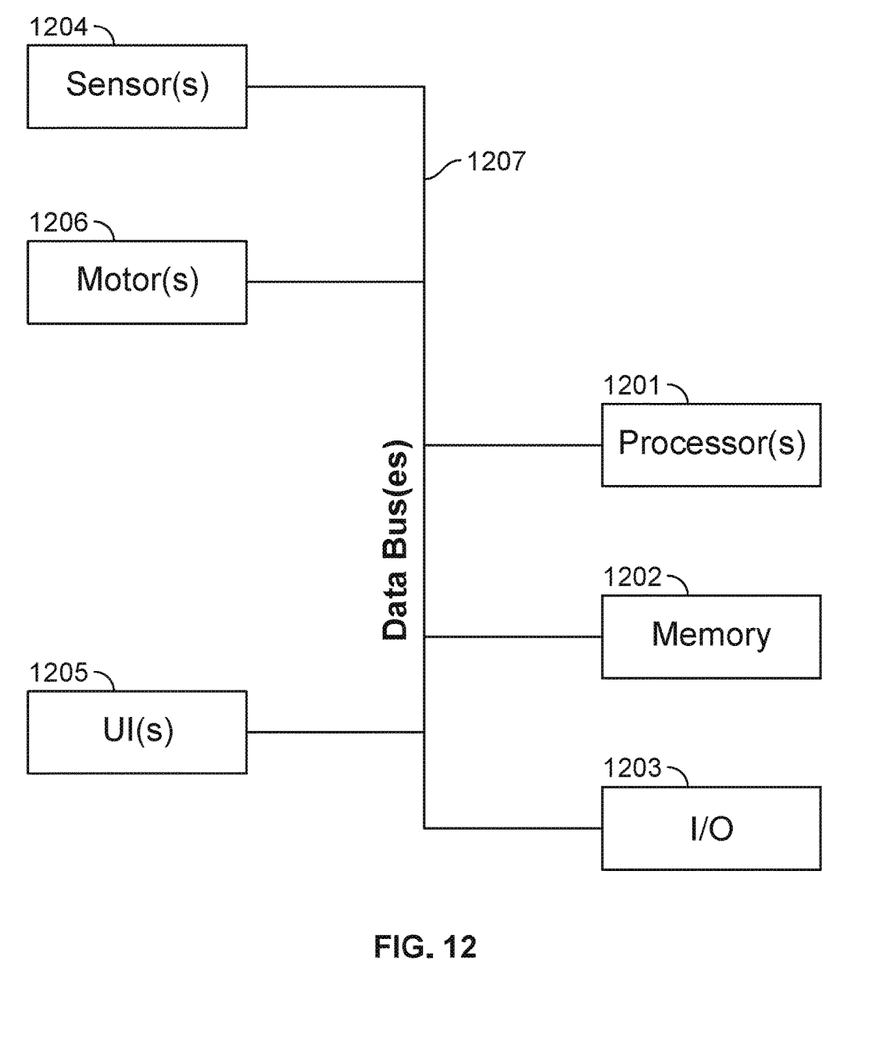
FIG. 12 is a block diagram of an example processing system.

As schematically shown in FIG. 12, mobile device 100 (or any other device, such as a vehicle or desktop computer) can include a processing system 1200. Processing system 1200 can include one or more processors 1201, memory 1202, one or more input/output devices 1203, one or more sensors 1204, one or more user interfaces 1205, one or more motors/actuators 1206, and one or more data buses 1207.

Processors 1201 can include one or more distinct processors, each having one or more cores. Each of the distinct processors can have the same or different structure. Processors 1201 can include one or more central processing units (CPUs), one or more graphics processing units (GPUs), application specific integrated circuits (ASICs), digital signal processors (DSPs), and the like.

Processors 1201 are configured to perform a certain function or operation at least when one of the one or more of the distinct processors is capable of executing code, stored on memory 1202 embodying the function or operation. Processors 1201 can be configured to perform any and all functions, methods, and operations disclosed herein.

Mobile device 100 is configured to perform a function, method, or operation at least when processors 1201 are configured to do the same.

Memory 1202 can include volatile memory, non-volatile memory, and any other medium capable of storing data. Each of the volatile memory, non-volatile memory, and any other type of memory can include multiple different memory devices, located at a multiple distinct locations and each having a different structure.

Examples of memory 1202 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine readable code saved in memory 1202.

Input-output devices 1203 can include any component for trafficking data such as ports and telematics. Input-output devices 1203 can enable wired communication via USB®, DisplayPort®, HDMI®, Ethernet, and the like. Input-output devices 1203 can enable electronic, optical, magnetic, and holographic, communication with suitable memory 1203. Input-output devices can enable wireless communication via WiFi®, Bluetooth®, cellular (e.g., LTE®, CDMA®, GSM®, WiMax®, NFU®), GPS, and the like.

Sensors 1204 can capture physical measurements of environment and report the same to processors 1201. Sensors 1204 can include first camera 111 and second camera 121. Each of first camera 111 and second camera 121 can include one or more lenses, one or more apertures, and one or more photodiode panels arranged along an optical axis. First camera 111 can have a wide-angle lens and second camera 121 can have a telephoto lens.

User interface 1205 can enable user interaction with imaging system 100. User interface 1205 can include displays (e.g., OLED touchscreens, LED touchscreens), physical buttons, speakers, microphones, keyboards, and the like. User interface 1205 can include display 102 and physical button 103.

Motors/actuators 1206 can enable processor 1201 to control mechanical or chemical forces. If either first or second camera 105, 106 includes auto-focus, motors/actuators 1206 can move a lens along its optical axis to provide auto-focus.

Data bus 1207 can traffic data between the components of processing system 1200. Data bus 1207 can include conductive paths printed on, or otherwise applied to, a substrate (e.g., conductive paths on a logic board), SATA cables, coaxial cables, USB® cables, Ethernet cables, copper wires, and the like. Data bus 1207 can be conductive paths of a logic board to which processor 1201 and the volatile memory are mounted. Data bus 1207 can include a wireless communication pathway. Data bus 1207 can include a series of different wires 1207 (e.g., USB® cables) through which different components of processing system 1200 are connected.

We claim:

1. A method of producing a stabilized video, the stabilized video comprising a sequence of stabilized frames, the method comprising:
   accessing a first video comprising a sequence of first frames captured by a first camera subject to shake, each first frame having a first field of view;
   accessing a second video comprising a sequence of second frames captured by a second camera subject to shake, each second frame having a second field of view; and
   generating a first stabilized frame by forming a first composite frame comprising pixels derived from at least one first frame and pixels derived from at least one second frame, wherein generating the first stabilized frame comprises:
   mapping a first stabilized field of view of the first stabilized frame with respect to the at least one second frame to define a margin of the at least one second frame; and
   populating the margin with pixels derived from the at least one first frame.

2. The method of claim 1, wherein at least one second field of view is equal to at least one stabilized field of view.

3. The method of claim 2, wherein a second stabilized frame has the at least one stabilized field of view; the second stabilized frame not comprising pixels derived from any first frames.

4. The method of claim 3, wherein the at least one stabilized field of view is equal to the first stabilized field of view and the second stabilized frame is earlier in the sequence of stabilized frames than the first stabilized frame.

5. The method of claim 1, wherein the margin consists of pixels in the at least one second frame external to the first stabilized field of view.

6. The method of claim 1, wherein generating the first stabilized frame further comprises:
   identifying a margin of the first composite frame based on a first stabilized field of view of the first composite frame; and
   cropping the margin.

7. The method of claim 6, wherein at least one second field of view is equal to at least one stabilized field of view.

8. The method of claim 7, wherein a second stabilized frame has the at least one stabilized field of view; the second stabilized frame not comprising pixels derived from any first frames.

9. The method of claim 8, wherein the at least one stabilized field of view is equal to the first stabilized field of view and the second stabilized frame is earlier in the sequence of stabilized frames than the first stabilized frame.

10. The method of claim 6, wherein the margin consists of pixels in the first composite frame external to the first stabilized field of view.

11. The method of claim 1, wherein a two-dimensional area of each stabilized field of view is greater than or equal to a two-dimensional area of each second field of view.

12. The method of claim 1, wherein a second stabilized frame with a second stabilized field of view comprises pixels derived from at least one of the second frames, but none of the first frames.

13. The method of claim 12, wherein each stabilized field of view, including the first stabilized field of view and the second stabilized field of view, is the same.

14. The method of claim 1, wherein the stabilized fields of view are the same and the method comprises:
   presenting a plurality of different second frames;
   receiving a user command; and
   setting the stabilized field of view as being equal to the second frame presented at the time of receiving the user command.

15. A processing system rising one or more processors configured to:
   access a first video comprising a sequence of first frames captured by a first camera subject to shake, each first frame having a first field of view;
   access a second video comprising a sequence of second frames captured by a second camera subject to shake, each second frame having a second field of view; and
   generating a first stabilized frame by forming a first composite frame comprising pixels derived from at least one of the first frames and pixels derived from at least one of the second frames, wherein generating the first stabilized frame comprises:
      mapping the first stabilized field of view with respect to the at least one second frame to define a margin of the at least one second frame; and
      populating the margin with pixels derived from the at least one first frame.

16. The processing system of claim 15, wherein the one or more processors are configured to:
   set at least one stabilized field of view as equal to at least one second field of view; and
   generate a second stabilized frame that does not comprise pixels derived from any first frames.

17. The processing claim of 15, wherein the one or more processors are configured to define the margin such that the margin consists of pixels in the at least one second frame external to the first stabilized field of view.

18. The processing system of claim 15, wherein the one or more processors are configured to prepare the first stabilized frame by:
   identifying a first margin of the first composite frame based on the first stabilized field of view; and
   cropping the first margin.

19. The processing system of claim 18, wherein the one or more processors are configured to:
   set at least one stabilized field of view as equal to at least one second field of view; and
   prepare a second stabilized frame having the at least one stabilized field of view, the second stabilized frame not comprising pixels derived from any first frames.

20. The processing system of claim 18, wherein the one or more processors are configured to define the margin such that the margin consists of pixels in the first composite frame external to the first stabilized field of view.

21. The processing system of claim 15, wherein the one or more processors are configured to:
   (a) make a two-dimensional area of each stabilized field of view greater than or equal to a two-dimensional area of each second field of view;
   (b) prepare a second stabilized frame having a second stabilized field of view where the second stabilized frame comprises pixels derived from at least one of the second frames, but none of the first frames; and
   (c) make each stabilized field of view the same.

22. The processing system of claim 15, wherein the stabilized fields of view are the same and the one or more processors are configured to:
   present a plurality of different second frames;
   receive a user command; and
   set the stabilized field of view as being equal to the second frame presented at the time of receiving the user command.

23. A non-transitory computer-readable medium comprising program code, which, when executed by one or more processors, causes the one or more processors to perform operations, the program code comprising code for:
   accessing a first video comprising a sequence of first frames captured by a first camera subject to shake, each first frame having a first field of view; and
   accessing a second video comprising a sequence of second frames captured by a second camera subject to shake, each second frame having a second field of view;
   generating a first stabilized frame by forming a first composite frame comprising pixels derived from at least one second frame and pixels derived from at least one first frame, wherein generating the first stabilized frame comprises:
      mapping the first stabilized field of view with respect to the at least one second frame to define a margin of the at least one second frame;
      populating the margin with pixels derived from the at least one first frame.

* * * * *

UNITED STATES PATENT AND TRADEMARK OFFICE
CERTIFICATE OF CORRECTION

PATENT NO. : 10,404,916 B2
APPLICATION NO. : 15/691240
DATED : September 3, 2019
INVENTOR(S) : Parkkila et al.

Page 1 of 1

It is certified that error appears in the above-identified patent and that said Letters Patent is hereby corrected as shown below:

In the Claims

Claim 15, at Column 17, Line 1, replace "rising" with --comprising--

Signed and Sealed this
Fourteenth Day of July, 2020

Andrei Iancu
*Director of the United States Patent and Trademark Office*